(12) United States Patent
Thiemann (10) Patent No.: US 11,162,309 B2
(45) Date of Patent: Nov. 2, 2021

(54) COMPENSATED TOP DRIVE UNIT AND ELEVATOR LINKS

(71) Applicant: Weatherford Technology Holdings, LLC, Houston, TX (US)

(72) Inventor: Bjoern Thiemann, Burgwedel (DE)

(73) Assignee: Weatherford Technology Holdings, LLC, Houston, TX (US)

( * ) Notice: Subject to any disclaimer, the term of this patent is extended or adjusted under 35 U.S.C. 154(b) by 1558 days.

(21) Appl. No.: 15/005,809

(22) Filed: Jan. 25, 2016

(65) Prior Publication Data
US 2017/0211343 A1 Jul. 27, 2017

(51) Int. Cl.
  E21B 19/16 (2006.01)
  E21B 3/02 (2006.01)
  E21B 17/042 (2006.01)
  F16H 19/02 (2006.01)

(52) U.S. Cl.
  CPC .............. *E21B 19/164* (2013.01); *E21B 3/02* (2013.01); *E21B 17/042* (2013.01); *F16H 19/02* (2013.01)

(58) Field of Classification Search
  CPC ........ E21B 19/164; E21B 3/02; E21B 17/042; F16H 19/02
  USPC ....................................................... 166/380
  See application file for complete search history.

(56) References Cited

U.S. PATENT DOCUMENTS

| | | |
|---|---|---|
| 1,367,156 A | 2/1921 | McAlvay et al. |
| 1,610,977 A | 12/1926 | Scott |
| 1,822,444 A | 9/1931 | MacClatchie |
| 2,370,354 A | 2/1945 | Hurst |
| 3,147,992 A | 9/1964 | Haeber et al. |
| 3,354,951 A | 11/1967 | Savage et al. |
| 3,385,370 A | 5/1968 | Knox et al. |
| 3,662,842 A | 5/1972 | Bromell |
| 3,698,426 A | 10/1972 | Litchfield et al. |
| 3,747,675 A | 7/1973 | Brown |
| 3,766,991 A | 10/1973 | Brown |
| 3,774,697 A | 11/1973 | Brown |
| 3,776,320 A | 12/1973 | Brown |
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,964,552 A | 6/1976 | Slator |
| 4,022,284 A | 5/1977 | Crow |

(Continued)

FOREIGN PATENT DOCUMENTS

| | | |
|---|---|---|
| AU | 2012201644 A1 | 4/2012 |
| AU | 2013205714 A1 | 5/2013 |

(Continued)

OTHER PUBLICATIONS

PCT International Search Report and Written Opinion dated Apr. 4, 2017, for International Application No. PCT/US2017/014646.

(Continued)

*Primary Examiner* — Matthew Troutman
*Assistant Examiner* — Patrick F Lambe
(74) *Attorney, Agent, or Firm* — Patterson + Sheridan, LLP (57) ABSTRACT

A top drive unit including a top drive housing, a drive stem disposed in the top drive housing, a carrier configured to axially move the drive stem relative to the top drive housing, and a drive mechanism for rotating the drive stem.

20 Claims, 3 Drawing Sheets

(56) References Cited

U.S. PATENT DOCUMENTS

| | | |
|---|---|---|
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,449,596 A | 5/1984 | Boyadjieff |
| 4,478,244 A | 10/1984 | Garrett |
| 4,497,224 A | 2/1985 | Jürgens |
| 4,593,773 A | 6/1986 | Skeie |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,215,153 A | 6/1993 | Younes |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,433,279 A | 7/1995 | Tessari et al. |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,053,191 A | 4/2000 | Hussey |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Hosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,527,047 B1 | 3/2003 | Pietras |
| 6,536,520 B1 | 3/2003 | Snider et al. |
| 6,571,876 B2 | 6/2003 | Szarka |
| 6,578,632 B2 | 6/2003 | Mullins |
| 6,595,288 B2 | 7/2003 | Mosing et al. |
| 6,604,578 B2 | 8/2003 | Mullins |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,779,599 B2 | 8/2004 | Mullins et al. |
| 6,832,656 B2 | 12/2004 | Fournier, Jr. et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |
| 7,281,587 B2 | 10/2007 | Haugen |
| 7,303,022 B2 | 12/2007 | Tilton et al. |
| 7,325,610 B2 | 2/2008 | Giroux et al. |
| 7,353,880 B2 | 4/2008 | Pietras |
| 7,448,456 B2 | 11/2008 | Shahin et al. |
| 7,451,826 B2 | 11/2008 | Pietras |
| 7,490,677 B2 | 2/2009 | Buytaert et al. |
| 7,503,397 B2 | 3/2009 | Giroux et al. |
| 7,509,722 B2 | 3/2009 | Shahin et al. |
| 7,513,300 B2 | 4/2009 | Pietras et al. |
| 7,591,304 B2 | 9/2009 | Juhasz et al. |
| 7,617,866 B2 | 11/2009 | Pietras |
| 7,635,026 B2 | 12/2009 | Mosing et al. |
| 7,665,515 B2 | 2/2010 | Mullins |
| 7,665,530 B2 | 2/2010 | Wells et al. |
| 7,665,531 B2 | 2/2010 | Pietras |
| 7,669,662 B2 | 3/2010 | Pietras |
| 7,690,422 B2 | 4/2010 | Swietlik et al. |
| 7,694,730 B2 | 4/2010 | Angman |
| 7,694,744 B2 | 4/2010 | Shahin |
| 7,699,121 B2 | 4/2010 | Juhasz et al. |
| 7,712,523 B2 | 5/2010 | Snider et al. |
| 7,730,698 B1 | 6/2010 | Montano et al. |

(56) References Cited

U.S. PATENT DOCUMENTS

| | | |
|---|---|---|
| 7,757,759 B2 | 7/2010 | Jahn et al. |
| 7,779,922 B1 | 8/2010 | Harris et al. |
| 7,793,719 B2 | 9/2010 | Snider et al. |
| 7,817,062 B1 | 10/2010 | Li et al. |
| 7,828,085 B2 | 11/2010 | Kuttel et al. |
| 7,841,415 B2 | 11/2010 | Winter |
| 7,854,265 B2 | 12/2010 | Zimmermann |
| 7,866,390 B2 | 1/2011 | Latiolais, Jr. et al. |
| 7,874,352 B2 | 1/2011 | Odell, II et al. |
| 7,874,361 B2 | 1/2011 | Mosing et al. |
| 7,878,237 B2 | 2/2011 | Angman |
| 7,878,254 B2 | 2/2011 | Abdollahi et al. |
| 7,882,902 B2 | 2/2011 | Boutwell, Jr. |
| 7,896,084 B2 | 3/2011 | Haugen |
| 7,918,273 B2 | 4/2011 | Snider et al. |
| 7,958,787 B2 | 6/2011 | Hunter |
| 7,971,637 B2 | 7/2011 | Duhon et al. |
| 7,975,768 B2 | 7/2011 | Fraser et al. |
| 8,118,106 B2 | 2/2012 | Wiens et al. |
| 8,141,642 B2 | 3/2012 | Olstad et al. |
| 8,210,268 B2 | 7/2012 | Heidecke et al. |
| 8,281,856 B2 | 10/2012 | Jahn et al. |
| 8,307,903 B2 | 11/2012 | Redlinger et al. |
| 8,365,834 B2 | 2/2013 | Liess et al. |
| 8,459,361 B2 | 6/2013 | Leuchtenberg |
| 8,505,984 B2 | 8/2013 | Henderson et al. |
| 8,567,512 B2 | 10/2013 | Odell, II et al. |
| 8,601,910 B2 | 12/2013 | Begnaud |
| 8,636,067 B2 | 1/2014 | Robichaux et al. |
| 8,651,175 B2 | 2/2014 | Fallen |
| 8,668,003 B2 | 3/2014 | Osmundsen et al. |
| 8,708,055 B2 | 4/2014 | Liess et al. |
| 8,727,021 B2 | 5/2014 | Heidecke et al. |
| 8,776,898 B2 | 7/2014 | Liess et al. |
| 8,783,339 B2 | 7/2014 | Sinclair et al. |
| 8,839,884 B2 | 9/2014 | Kuttel et al. |
| 8,893,772 B2 | 11/2014 | Henderson et al. |
| 9,068,406 B2 | 6/2015 | Clasen et al. |
| 9,206,851 B2 | 12/2015 | Slaughter, Jr. et al. |
| 9,528,326 B2 | 12/2016 | Heidecke et al. |
| 9,631,438 B2 | 4/2017 | McKay |
| 2002/0043403 A1 | 4/2002 | Juhasz et al. |
| 2002/0074132 A1 | 6/2002 | Juhasz et al. |
| 2002/0084069 A1 | 7/2002 | Mosing et al. |
| 2002/0129934 A1 | 9/2002 | Mullins et al. |
| 2002/0170720 A1 | 11/2002 | Haugen |
| 2003/0098150 A1 | 5/2003 | Andreychuk |
| 2003/0107260 A1 | 6/2003 | Ording et al. |
| 2003/0221519 A1 | 12/2003 | Haugen |
| 2004/0003490 A1 | 1/2004 | Shahin et al. |
| 2004/0069497 A1 | 4/2004 | Jones et al. |
| 2004/0216924 A1 | 11/2004 | Pietras et al. |
| 2005/0000691 A1 | 1/2005 | Giroux et al. |
| 2005/0173154 A1 | 8/2005 | Lesko |
| 2005/0206163 A1 | 9/2005 | Guesnon et al. |
| 2005/0257933 A1 | 11/2005 | Pietras |
| 2005/0269072 A1 | 12/2005 | Folk et al. |
| 2005/0269104 A1 | 12/2005 | Folk et al. |
| 2005/0269105 A1 | 12/2005 | Pietras |
| 2005/0274508 A1 | 12/2005 | Folk et al. |
| 2006/0037784 A1 | 2/2006 | Walter et al. |
| 2006/0124353 A1 | 6/2006 | Juhasz et al. |
| 2006/0151181 A1 | 7/2006 | Shahin |
| 2006/0180315 A1 | 8/2006 | Shahin et al. |
| 2007/0030167 A1 | 2/2007 | Li et al. |
| 2007/0044973 A1 | 3/2007 | Fraser et al. |
| 2007/0074588 A1 | 4/2007 | Harata et al. |
| 2007/0074874 A1 | 4/2007 | Richardson |
| 2007/0102992 A1 | 5/2007 | Jager |
| 2007/0131416 A1 | 6/2007 | Odell, II et al. |
| 2007/0140801 A1 | 6/2007 | Kuttel et al. |
| 2007/0144730 A1 | 6/2007 | Shahin et al. |
| 2007/0158076 A1 | 7/2007 | Hollingsworth, Jr. et al. |
| 2007/0251699 A1* | 11/2007 | Wells ............... E21B 19/16 166/377 |
| 2007/0251701 A1 | 11/2007 | Jahn et al. |
| 2007/0257811 A1 | 11/2007 | Hall et al. |
| 2008/0059073 A1 | 3/2008 | Giroux et al. |
| 2008/0093127 A1 | 4/2008 | Angman |
| 2008/0099196 A1 | 5/2008 | Latiolais et al. |
| 2008/0125876 A1 | 5/2008 | Boutwell |
| 2008/0202812 A1 | 8/2008 | Childers et al. |
| 2008/0308281 A1 | 12/2008 | Boutwell, Jr. et al. |
| 2009/0151934 A1 | 6/2009 | Heidecke et al. |
| 2009/0159294 A1 | 6/2009 | Abdollahi et al. |
| 2009/0200038 A1 | 8/2009 | Swietlik et al. |
| 2009/0205820 A1 | 8/2009 | Koederitz et al. |
| 2009/0205827 A1 | 8/2009 | Swietlik et al. |
| 2009/0205836 A1 | 8/2009 | Swietlik et al. |
| 2009/0205837 A1 | 8/2009 | Swietlik et al. |
| 2009/0229837 A1 | 9/2009 | Wiens et al. |
| 2009/0266532 A1 | 10/2009 | Revheim et al. |
| 2009/0272537 A1 | 11/2009 | Alikin et al. |
| 2009/0274544 A1 | 11/2009 | Liess |
| 2009/0274545 A1 | 11/2009 | Liess et al. |
| 2009/0316528 A1 | 12/2009 | Ramshaw et al. |
| 2009/0321086 A1 | 12/2009 | Zimmermann |
| 2010/0032162 A1 | 2/2010 | Olstad et al. |
| 2010/0101805 A1 | 4/2010 | Angelle et al. |
| 2010/0200222 A1 | 8/2010 | Robichaux et al. |
| 2010/0206583 A1 | 8/2010 | Swietlik et al. |
| 2010/0206584 A1 | 8/2010 | Clubb et al. |
| 2010/0236777 A1 | 9/2010 | Partouche et al. |
| 2011/0036586 A1 | 2/2011 | Hart et al. |
| 2011/0039086 A1 | 2/2011 | Graham et al. |
| 2011/0088495 A1 | 4/2011 | Buck et al. |
| 2011/0214919 A1 | 9/2011 | McClung, III |
| 2011/0280104 A1 | 11/2011 | McClung, III |
| 2012/0048574 A1 | 3/2012 | Wiens et al. |
| 2012/0152530 A1 | 6/2012 | Wiedecke et al. |
| 2012/0160517 A1 | 6/2012 | Bouligny et al. |
| 2012/0212326 A1 | 8/2012 | Christiansen et al. |
| 2012/0234107 A1 | 9/2012 | Pindiprolu et al. |
| 2012/0298376 A1 | 11/2012 | Twardowski |
| 2013/0055858 A1* | 3/2013 | Richardson ............ E21B 19/164 81/57.11 |
| 2013/0056977 A1 | 3/2013 | Henderson et al. |
| 2013/0062074 A1 | 3/2013 | Angelle et al. |
| 2013/0075077 A1 | 3/2013 | Henderson et al. |
| 2013/0075106 A1 | 3/2013 | Tran et al. |
| 2013/0105178 A1 | 5/2013 | Pietras |
| 2013/0207382 A1 | 8/2013 | Robichaux |
| 2013/0207388 A1 | 8/2013 | Jansson et al. |
| 2013/0233624 A1 | 9/2013 | In |
| 2013/0269926 A1 | 10/2013 | Liess et al. |
| 2013/0271576 A1 | 10/2013 | Elllis |
| 2013/0275100 A1 | 10/2013 | Ellis et al. |
| 2013/0299247 A1 | 11/2013 | Küttel et al. |
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustavsson et al. |
| 2014/0262521 A1 | 9/2014 | Bradley et al. |
| 2014/0305662 A1 | 10/2014 | Giroux et al. |
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2015/0014063 A1 | 1/2015 | Simanjuntak et al. |
| 2015/0053424 A1 | 2/2015 | Wiens et al. |
| 2015/0083391 A1 | 3/2015 | Bangert et al. |
| 2015/0107385 A1 | 4/2015 | Mullins et al. |
| 2015/0337648 A1 | 11/2015 | Zippel et al. |
| 2016/0024862 A1 | 1/2016 | Wilson et al. |
| 2016/0138348 A1 | 5/2016 | Kunec |
| 2016/0145954 A1 | 5/2016 | Helms et al. |
| 2016/0177639 A1 | 6/2016 | McIntosh et al. |
| 2016/0215592 A1 | 7/2016 | Helms et al. |
| 2016/0230481 A1 | 8/2016 | Misson et al. |
| 2017/0037683 A1 | 2/2017 | Heidecke et al. |
| 2017/0044854 A1 | 2/2017 | Hebebrand et al. |
| 2017/0044875 A1 | 2/2017 | Hebebrand et al. |
| 2017/0051568 A1 | 2/2017 | Wern et al. |
| 2017/0067303 A1 | 3/2017 | Thiemann et al. |

(56) References Cited

U.S. PATENT DOCUMENTS

| | | |
|---|---|---|
| 2017/0067320 A1 | 3/2017 | Zouhair et al. |
| 2017/0074075 A1 | 3/2017 | Liess |
| 2017/0211327 A1 | 7/2017 | Wern et al. |
| 2017/0211343 A1 | 7/2017 | Thiemann |
| 2017/0284164 A1 | 10/2017 | Holmes et al. |

FOREIGN PATENT DOCUMENTS

| | | | |
|---|---|---|---|
| AU | 2014215938 | A1 | 9/2014 |
| CA | 2 707 050 | A1 | 6/2009 |
| CA | 2 841 654 | A1 | 8/2015 |
| CA | 2 944 327 | A1 | 10/2015 |
| DE | 102007016822 | A1 | 10/2008 |
| EP | 0 250 072 | A2 | 12/1987 |
| EP | 1 619 349 | A2 | 1/2006 |
| EP | 1 772 715 | A2 | 4/2007 |
| EP | 1 961 912 | A1 | 8/2008 |
| EP | 1 961 913 | A1 | 8/2008 |
| EP | 2085566 | A2 | 8/2009 |
| EP | 2 322 357 | A1 | 5/2011 |
| EP | 3032025 | A1 | 6/2016 |
| GB | 1487948 | A | 10/1977 |
| GB | 2 077 812 | A | 12/1981 |
| GB | 2 180 027 | A | 3/1987 |
| GB | 2 228 025 | A | 8/1990 |
| GB | 2 314 391 | A | 12/1997 |
| WO | 2004/079153 | A2 | 9/2004 |
| WO | 2004/101417 | A2 | 11/2004 |
| WO | 2007/001887 | A2 | 1/2007 |
| WO | 2007/070805 | A2 | 6/2007 |
| WO | 2007127737 | A2 | 11/2007 |
| WO | 2008005767 | A1 | 1/2008 |
| WO | 2009/076648 | A2 | 6/2009 |
| WO | 2012100019 | A1 | 7/2012 |
| WO | 2012/115717 | A2 | 8/2012 |
| WO | 2014056092 | A1 | 4/2014 |
| WO | 2015/000023 | A1 | 1/2015 |
| WO | 2015/119509 | A1 | 8/2015 |
| WO | 2015/127433 | A1 | 8/2015 |
| WO | 2015176121 | A1 | 11/2015 |
| WO | 2016197255 | A1 | 12/2016 |
| WO | 2017/044384 | A1 | 3/2017 |

OTHER PUBLICATIONS

A123 System; 14Ah Prismatic Pouch Cell; Nanophosphate® Lithium-Ion; www.a123systems.com; date unknown; 1 page.
Streicher Load/Torque Cell Systems; date unknown; 1 page.
3PS, Inc.; Enhanced Torque and Tension Sub with Integrated Turns; date unknown; 2 total pages.
Lefevre, et al.; Drilling Technology; Deeper, more deviated wells push development of smart drill stem rotary shouldered connections; dated 2008; 2 total pages.
PCT Invitaiton to Pay Additional Fees for International Application No. PCT/US2008/086699; dated Sep. 9, 2009; 7 total pages.
PCT Notification of Transmittal of the International Search Report and the Written Opinion of the International Searching Authority for International Application No. PCT/US2008/086699; dated Sep. 11, 2009; 19 total pages.
National Oilwell Varco; Rotary Shoulder Handbook; dated 2010; 116 total pages.
Weatherford; TorkSub™ Stand-Alone Torque Measuring System; dated 2011-2014; 4 total pages.
Australian Examination Report for Application No. 2008334992; dated Apr. 5, 2011; 2 total pages.
European Search Report for Application No. 08 860 261.0-2315; dated Apr. 12, 2011; 4 total pages.
Eaton; Spool Valve Hydraulic Motors; dated Sep. 2011; 16 total pages.
European Extended Search Report for Application No. 12153779.9-2315; dated Apr. 5, 2012; 4 total pages.
Australian Examination Report for Application No. 2012201644; dated May 15, 2013; 3 total pages.
Warrior; 250E Electric Top Drive (250-ton); 250H Hydraulic Top Drive (250-ton); dated Apr. 2014; 4 total pages.
Hydraulic Pumps & Motors; Fundamentals of Hydraulic Motors; dated Jun. 26, 2014; 6 total pages.
Warrior; Move Pipe Better; 500E Electric Top Drive (500 ton—1000 hp); dated May 2015; 4 total pages.
Canadian Office Action for Application No. 2,837,581; dated Aug. 24, 2015; 3 total pages.
European Extended Search Report for Application No. 15166062.8-1610; dated Nov. 23, 2015; 6 total pages.
Australian Examination Report for Application No. 2014215938; dated Feb. 4, 2016; 3 total pages.
Rexroth; Bosch Group; Motors and Gearboxes; Asynchronous high-speed motors 1 MB for high speeds; dated Apr. 13, 2016; 6 total pages.
Canadian Office Action for Application No. 2,837,581; dated Apr. 25, 2016; 3 total pages.
PCT Notification of Transmittal of the International Search Report and the Written Opinion of the International Searching Authority for International Application No. PCT/US2015/061960; dated Jul. 25, 2016; 16 total pages.
PCT Notification of Transmittal of the International Search Report and the Written Opinion of the International Searching Authority for International Application No. PCT/US2016/049462; dated Nov. 22, 2016; 14 total pages.
PCT Notification of Transmittal of the International Search Report and the Written Opinion of the International Searching Authority for International Application No. PCT/US2016/050542; dated Nov. 25, 2016; 13 total pages.
PCT Notification of Transmittal of the International Search Report and the Written Opinion of the International Searching Authority for International Application No. PCT/US2016/046458; dated Dec. 14, 2016; 16 total pages.
PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
European Patent Office; Extended European Search Report for Application No. 18157915.2; dated Jun. 6, 2018; 8 total pages.
Canadian Office Action in related application CA 2,955,754 dated Jul. 17, 2018.
EPO Extended European Search Report dated Jul. 19, 2018, for European Application No. 18159595.0.
EPO Extended European Search Report dated Jul. 17, 2018, for European Application No. 18158050.7.
Cookson, Colter, "Inventions Speed Drilling, Cut Costs," The American Oil & Gas Reporter, Sep. 2015, 2 pages.
Ennaifer, Amine et al., "Step Change in Well Testing Operations," Oilfield Review, Autumn 2014: 26, No. 3, pp. 32-41.

(56) References Cited

OTHER PUBLICATIONS

Balltec Lifting Solutions, LiftLOK™ Brochure, "Highest integrity lifting tools for the harshest environments," 2 pages.
Balltec Lifting Solutions, CoilLOK™ Brochure, "Highest integrity hand-held coiled tubing handling tools," 2 pages.
Peters; Tool Coupler for Use With a Top Drive; U.S. Appl. No. 15/656,508, filed Jul. 21, 2017.
Fuehring et al.; Tool Coupler With Rotating Coupling Method for Top Drive; U.S. Appl. No. 15/445,758, filed Feb. 28, 2017.
Bell; Interchangeable Swivel Combined Multicoupler; U.S. Appl. No. 15/607,159, filed May 26, 2017.
Amezaga; Dual Torque Transfer for Top Drive System; U.S. Appl. No. 15/447,881, filed Mar. 2, 2017.
Zouhair; Coupler With Threaded Connection for Pipe Handler; U.S. Appl. No. 15/444,016, filed Feb. 27, 2017.
Liess; Downhole Tool Coupling System; U.S. Appl. No. 15/670,897, filed Aug. 7, 2017.
Muller et al; Combined Multi-Coupler With Rotating Locking Method for Top Drive; U.S. Appl. No. 15/721,216, filed Sep. 29, 2017.
Amezaga et al; Tool Coupler With Threaded Connection for Top Drive; U.S. Appl. No. 15/457,572, filed Mar. 13, 2017.
Wiens; Combined Multi-Coupler With Locking Clamp Connection for Top Drive; U.S. Appl. No. 15/627,428, filed Jun. 19, 2017.
Henke et al.; Tool Coupler With Sliding Coupling Members for Top Drive; U.S. Appl. No. 15/448,297, filed Mar. 2, 2017.
Schoknecht et al.; Combined Multi-Coupler With Rotating Fixations for Top Drive; U.S. Appl. No. 15/447,926, filed Mar. 2, 2017.
Metzlaff et al.; Combined Multi-Coupler for Top Drive; U.S. Appl. No. 15/627,237, filed Jun. 19, 2017.
Liess; Combined Multi-Coupler for Top Drive; U.S. Appl. No. 15/656,914, filed Jul. 21, 2017.
Liess et al.; Combined Multi-Coupler; U.S. Appl. No. 15/656,684, filed Jul. 21, 2017.
Amezaga et al.; Tool Coupler With Data and Signal Transfer Methods for Top Drive; U.S. Appl. No. 15/730,305, filed Oct. 11, 2017.
Liess; Tool Coupler With Threaded Connection for Top Drive; U.S. Appl. No. 15/806,560, filed Nov. 8, 2017.
EPO Partial European Search Report dated Jul. 31, 2018, for European Application No. 18159597.6.
European Patent Office; Extended Search Report for Application No. 18160808.4; dated Sep. 20, 2018; 8 total pages.
EPO Partial European Search Report dated Oct. 4, 2018, for European Patent Application No. 18159598.4.
EPO Extended European Search Report dated Oct. 5, 2018, for European Patent Application No. 18173275.1.
EPO Extended European Search Report dated Nov. 6, 2018, for European Application No. 18159597.6.
International Search Report and Written Opinion in PCT/US2018/042812 dated Oct. 17, 2018.
Extended Search Report in application EP18177312.8 dated Nov. 6, 2018.
EPO Office Action dated Jul. 30, 2019, for European Application No. 17703292.7.
Australian Office Action dated Jun. 16, 2021, for Australian Patent Application No. 2017211056.

\* cited by examiner

COMPENSATED TOP DRIVE UNIT AND ELEVATOR LINKS

BACKGROUND OF THE DISCLOSURE

Field of the Disclosure

The present disclosure generally relates to a compensated top drive unit and elevator links.

Description of the Related Art

In the construction and completion of oil and gas wells, a drilling rig is used to facilitate the insertion and removal of tubular strings into a wellbore. Tubular strings are constructed by inserting a first tubular into a wellbore until only the upper end of the tubular extends out of the wellbore. A gripping member close to the surface of the wellbore then grips the upper end of the first tubular. The upper end of the first tubular has a threaded box end for connecting to a threaded pin end of a second tubular. The second tubular is lifted over the wellbore center, lowered onto or "stabbed into" the upper end of the first tubular, and then rotated such that the pin end of the second tubular is threadedly connected to the box end of the first tubular.

This process may be repeated to form a tubular string of desired length. However, it is desired not to damage the threads when the pin end is stabbed into the box end, or when torque is applied to overcome the weight of the second tubular resting on the threads. It is also desired that the drilling rig operator lowers the second tubular at the same rate at which the threads draw together. This reduces the chances of damaging the threads of the tubular and/or tubular string during makeup. Damaging the threads may result in improper connection between the tubular and the tubular string and leaks in the tubular string.

Therefore, there is a need for new and improved methods and apparatus for making up tubular connections.

SUMMARY OF THE INVENTION

Embodiments of the invention relate to apparatus and methods of making up a tubular with a tubular string. In one embodiment, a top drive unit includes a top drive housing, a drive stem disposed in the top drive housing, a carrier configured to axially move the drive stem relative to the top drive housing, and a drive mechanism for rotating the drive stem.

A method of making up a tubular connection using a top drive unit includes connecting a makeup tool to a drive stem of the top drive unit, engaging a tubular using the makeup tool, supporting the tubular using a carrier, rotating the tubular using the drive stem to connect the tubular to a tubular string, and moving the drive stem and the carrier axially relative to the top drive unit during connection of the tubular to the tubular string.

A method of making up a tubular connection using a top drive unit includes connecting an elevator to a bail housing of the top drive unit, engaging a tubular using a tong assembly, supporting the tubular using a carrier, rotating the tubular using the tong assembly to connect the tubular to a tubular string, and moving the carrier and the bail housing axially relative to the top drive unit during connection of the tubular to the tubular string.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
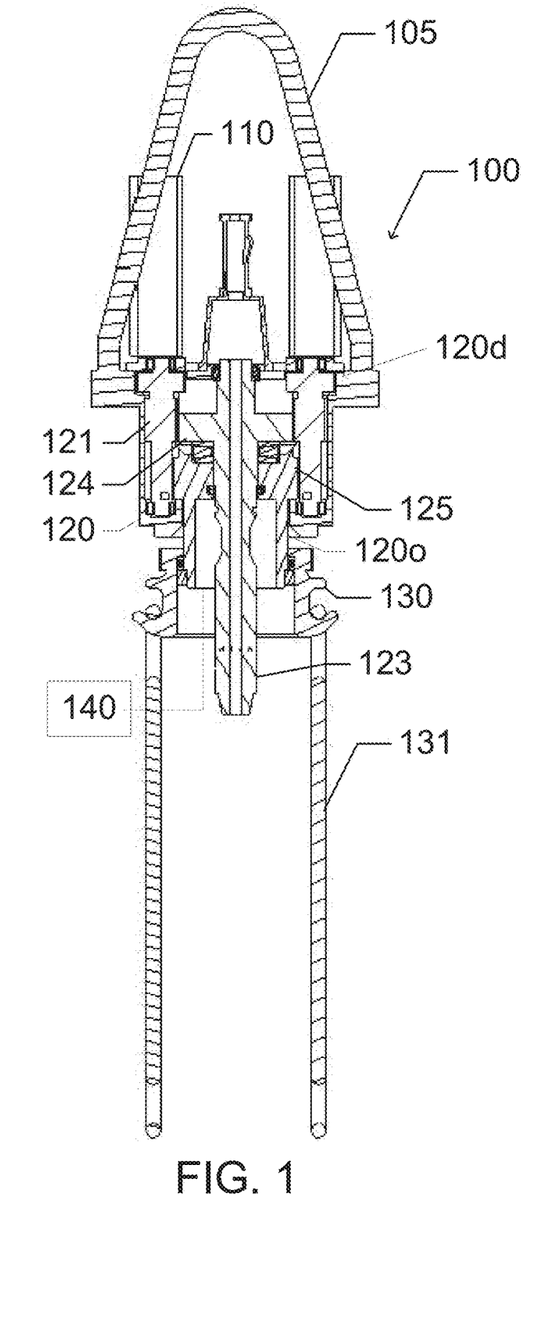
FIG. 1 illustrates a top drive unit in a lower, extended position according to one embodiment.

FIG. 1 is a schematic view of a top drive unit 100 in a lower, extended position. The top drive unit 100 is configured to compensate for axial movement of a tubular during makeup or breakout of a tubular with a tubular string. The top drive unit 100 may connected to a hoist bail 105. The hoist bail 105 may be disposed at the top of the top drive unit 100 and have an arched portion for connecting to a hook of a drawworks. The hook may be connected to the drawworks by a drilling line for lifting and lowering the top drive unit 100.

Figure 2A:
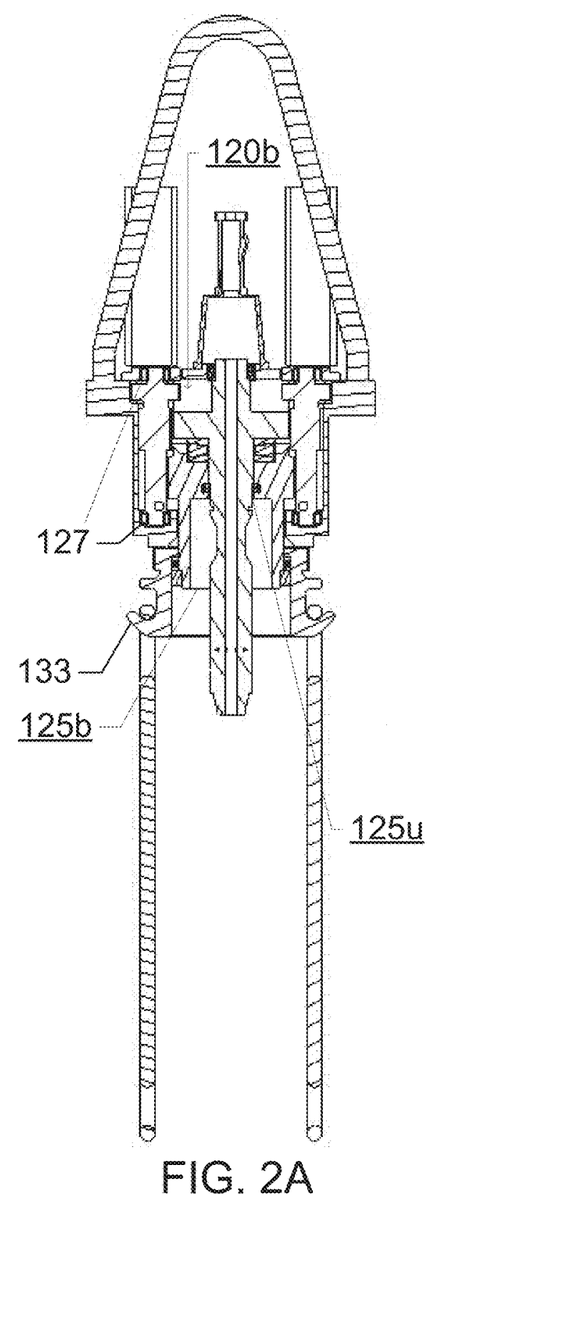
FIG. 2A illustrates a top drive unit in an upper, retracted position according to one embodiment.
Figure 2B:
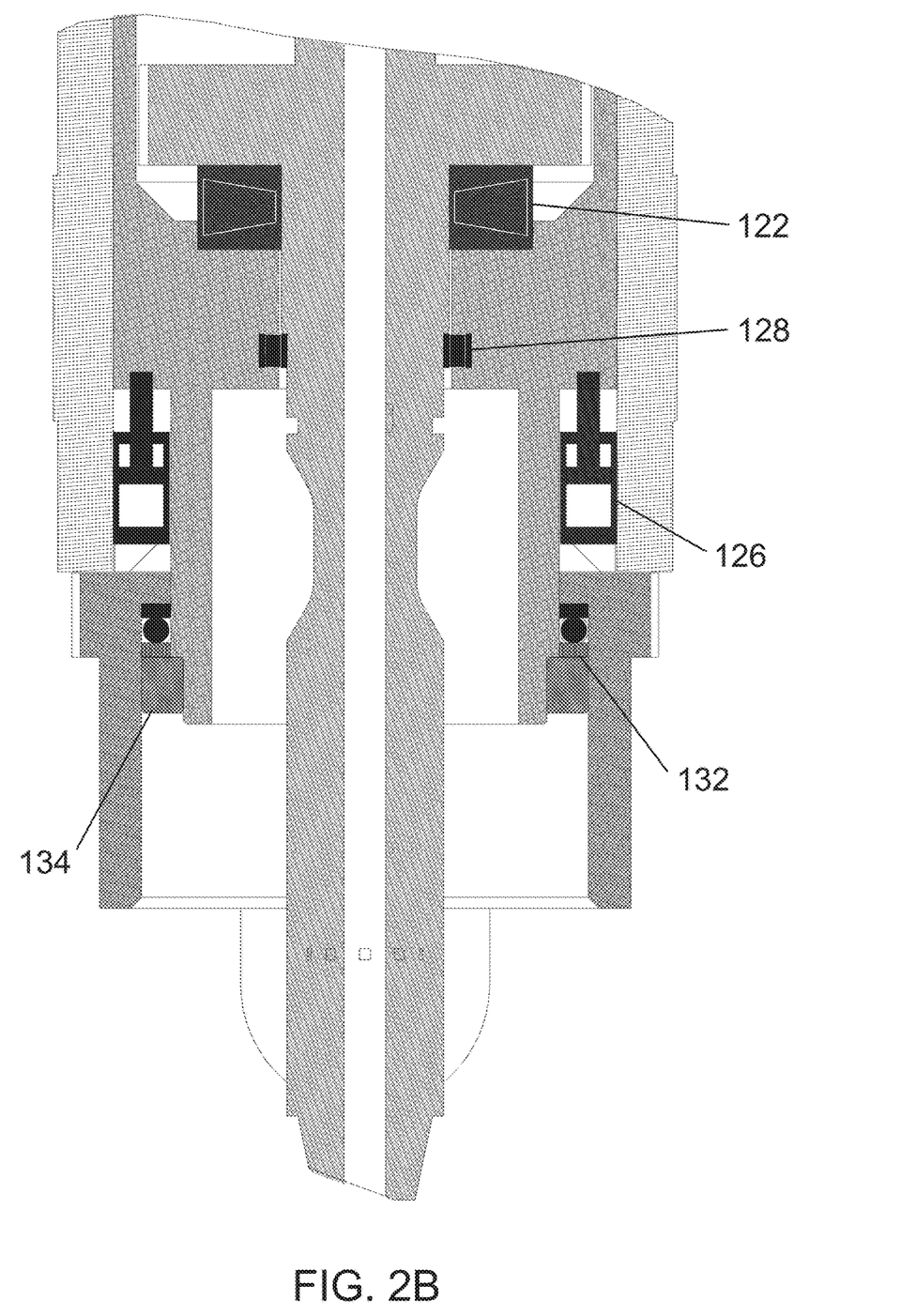
FIG. 2B illustrates an enlarged view of the top drive housing and bail housing of the top drive unit.

Referring to FIGS. 1 and 2A-B, the top drive unit 100 may include a top drive housing 120, a drive mechanism 120d, a thrust bearing 122 (FIG. 2B), a drive stem 123, a carrier 125, and compensation cylinders 126 (FIG. 2B). The top drive housing 120 may be a cylinder with a bore 120b (FIG. 2A) formed therethrough and having an opening 120o at a lower end. The drive mechanism 120d is configured to rotate the drive stem 123 relative to the top drive housing 120. In one embodiment, the drive mechanism 120d includes one or more actuators 110 (two shown), a first gear 121, and a second gear 124. The actuators 110 may be disposed on the top of the top drive housing 120. The one or more actuators 110 may be hydraulic or electric motors. Each actuator 110 is rotationally coupled to an upper end of a respective first gear 121. The first gear 121 may have a rotating shaft portion and a concentric geared portion disposed on the rotating shaft portion. The geared portion may have a greater diameter than the rotating shaft portion. The geared portion has gear teeth projecting outwards in a radial direction. The first gear 121 may be positioned adjacent to an inner surface of the top drive housing 120. Upper and lower ends of the first gear 121 may be supported by radial bearings 127 (FIG. 2A) disposed in a wall of the top drive housing 120. The radial bearings 127 facilitate rotational movement of the first gear 121 relative to the top drive housing 120. Alternatively, the drive mechanism 120d may be a direct drive motor coupled to the drive stem 123. The direct drive motor may be disposed in the top drive housing 120.

Figure 3:
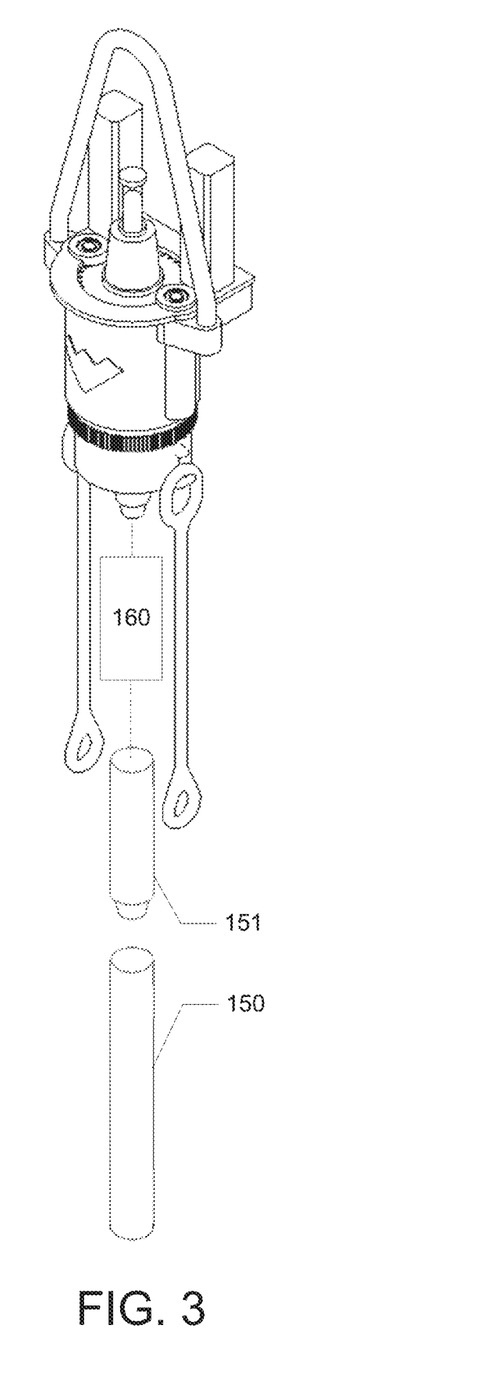
FIG. 3 illustrates a perspective view of the top drive unit connected to a makeup tool during makeup of a tubular with a tubular string.

The second gear 124 is rotationally coupled to the first gear 121. The second gear 124 may be disposed on an outer surface of the drive stem 123. The second gear 124 has a teeth profile for engagement with the gear teeth of the first gear 121. The second gear 124 may have an outer diameter greater than the outer diameter of the drive stem 123. The drive stem 123 may be disposed in the bore 120b of the top drive housing 120. The drive stem 123 may be a shaft with a bore therethrough. The lower end of the drive stem 123 may have a threaded profile for connecting to a makeup tool 160 (FIG. 3). The bore of the drive stem 123 may provide for injection of drilling fluid from mud pumps (not shown) through the makeup tool 160 and into the tubular.

A carrier 125 is longitudinally coupled to the second gear 124 using a thrust bearing 122 (FIG. 2B). In this embodiment, the carrier 125 is positioned below the second gear 124 and the thrust bearing 122 in the top drive housing 120. The carrier 125 has a tubular shape with an upper bore 125u and a lower bore 125b. The lower bore 125b may have a greater diameter than the upper bore 125u. The carrier 125 may have a shoulder for receiving the thrust bearing 122. The drive stem 123 may pass through the bores 125u, 125b of the carrier 125. A radial bearing 128 (FIG. 2B) may be disposed between the carrier 125 and the drive stem 123 to allow the drive stem 123 to rotate with respect to the carrier 125 and the top drive housing 120. The radial bearing 128 may be disposed in the upper bore 125b of the carrier 125. A lower end of the carrier 125 may be longitudinally coupled to a bail housing 130 using a thrust bearing 132 (FIG. 2B) and nut 134 (FIG. 2B). The thrust bearing 132 and nut 134 may be disposed between an outer surface of the carrier 125 and an inner surface of the bail housing 130. The nut 134 may be received in a lower shoulder of the carrier 125, and locks the thrust bearing 132 in place. The carrier 125 may be rotationally locked to prevent rotation relative to the top drive housing 120, such as by a key and keyway.

The bail housing 130 may have a tubular shape with a bore 130b (FIG. 2B) therethrough. The drive stem 123 may pass through the bore 130b of the bail housing 130. In one embodiment, the bail housing 130 may have a brake to selectively lock rotation of the bail housing 130 relative to the carrier 125. The outer surface of the bail housing 130 may have hooks 133 (FIG. 2A) for receiving elevator links 131. The elevator links 131 may have loops at both ends for connecting with the bail housing 130 at one end and an elevator 170 (FIG. 4) for gripping a tubular at the other end.

The carrier 125 is configured to support the weight of the drive stem 123 and the second gear 124, thereby allowing for axial movement of the thrust bearing 122, the second gear 124, and the drive stem 123 with the carrier 125. The thrust bearing 122 may transfer the load from the makeup tool 160 connected to the end of the drive stem 123 to the carrier 125. The carrier 125 may optionally be configured to also support the weight of the bail housing 130 and the elevator links 131, thereby allowing for axial movement of the bail housing 130 and elevator links 131 with the carrier 125.

The carrier 125 is longitudinally coupled to one or more compensation cylinders 126. Compensation cylinders 126 may be electric, pneumatic, or hydraulic cylinders. Compensation cylinders 126 may be disposed between the carrier 125 and the top drive housing 120. Compensation cylinders 126 are operable to axially move the carrier 125 during the makeup or breakout of a tubular with a tubular string. The carrier 125 is axially movable between an upper position (FIG. 2A) and a lower position (FIG. 1). Axial movement of the carrier 125 also axially moves the second gear 124, drive stem 123, and thrust bearing 122 inside the top drive housing 120. Further, the carrier 125 can axially move these components 122-124 relative to the top drive housing 120.

A control circuit 140 may be used to accommodate various loads acting on the drive stem 123. In one embodiment, the control circuit 140 may be connected to the carrier 125 to allow for different loads to be raised. Alternatively, the control circuit 140 may be connected to the compensation cylinders 126.

The second gear 124 may axially move relative to the first gear 121 during makeup or breakout of the tubular connection. An axial profile length of the first gear 121 may be sufficiently long to allow the second gear 124 to remain rotationally coupled to the first gear 121 as the carrier 125 moves the drive stem 123 and the second gear 124 between the lower, extended position (FIG. 1) and the upper, retracted position (FIG. 2A). Alternatively, an axial profile length of the second gear 124 may be sufficiently long to allow the first gear 121 to remain rotationally coupled to the second gear 124 throughout the axial movement of the carrier 125 during makeup or breakout. The lower end of the drive stem 123 may be connected to a makeup tool 160, such as by a threaded coupling.

Alternatively, the lower end of the drive stem 123 may be connected to a multi-connection system ("MCS"), as disclosed in U.S. patent application Ser. No. 15/004,390, filed on Jan. 22, 2016, the portions of the specification describing and illustrating the various types MCS are incorporated herein by reference. In one example, the MCS includes a drive stem connectable with a tool dock. The tool dock may form part of a tool such that connection with the top drive may be facilitated using the MCS. Exemplary tools include a tubular makeup tool, casing tool, and cementing tool. The MCS may be configured to transfer power, torque, data, hydraulic connections, electric connections, and pneumatic connections to the makeup tool 160. The MCS may have junction members for connecting the hydraulic, electric, pneumatic, and data supplies from the top drive unit 100 to the makeup assembly 160.

The carrier 125 may extend from the bottom of the top drive housing 120 and be coupled to the bail housing 130. The bail housing 130 may be coupled to elevator links 131 (FIG. 1). The elevator links 131 may be coupled to a lifting device for lifting a tubular, such as an elevator. The carrier 125 (via compensation cylinders 126) may compensate the weight of the bail housing 130 and the lifting device (via elevator links 131) when lifting the tubular. The carrier 125 can axially move the bail housing 130 and the elevator links 131, and the lifting device relative to the top drive housing 120.

FIG. 2 is a schematic view of the top drive unit 100 with the drive stem 123 in an upper, retracted position. The carrier 125 actuates the drive stem 123 by compensation cylinders 126 to the upper, retracted position.

Referring now to FIG. 3, the top drive unit 100 is shown connected to a makeup tool 160 for makeup of a tubular 151 to a tubular string 150. The makeup tool 160 is connected to the lower end of the drive stem 123 and rotatable therewith. In operation, the top drive unit 100 is lowered to place the makeup tool 160 into engagement with the tubular 151 that is to be made up to the tubular string 150. In particular, the tubular 151 is gripped by the makeup tool 160 using, for example, slips. The makeup tool 160 may be configured to engage an internal surface of the tubular 151 or an external surface of the tubular 151. The tubular string 150 may be retained by a spider located on the rig floor.

The weight of the tubular 151 is transferred to the compensation cylinders 126 through the makeup tool 160, the drive stem 123, and the carrier 125. The compensation cylinders 126 are operable to reduce the amount of tubular weight that is set down on the threads of the tubular 151 and the tubular string 150 during the makeup or breakout process.

After gripping the tubular 151, the top drive unit 100 moves the tubular 151 into position for threaded connection with the tubular string 150. The drive stem 123, second gear 124, and carrier 125 are in the upper, retracted position shown in FIG. 2A to begin the makeup process. Actuators 110 rotate the drive stem 123 by transferring torque via the rotational coupling between the first gears 121 and the second gear 124. In turn, the drive stem 123 transfers rotational movement to the tubular 151 to rotate the tubular 151 relative to the tubular string 150. During makeup, the compensation cylinders 126 may compensate for the downward travel of the tubular 151 due to the interaction between the threads by lowering the carrier 125, the second gear 124, and the drive stem 123. In this respect, the compensation cylinders 126 can reduce the load applied to the threads during makeup. FIG. 1 shows the carrier 125, the second gear 124, and the drive stem 123 in the lower, extended position. As the second gear 124 moves downward, it moves along the length of the first gear 121 and remains engaged with the first gear 121 to provide rotational movement to the drive stem 123. The length of the first gear 121 is configured to allow the second gear to remain in engagement through the makeup or breakout process.

After the threaded connection of the tubular to the tubular string is complete, the top drive unit 100 may disengage the tubular by releasing the tubular from the makeup tool 160. The compensation cylinders 126 may return the carrier 125 to the upper, retracted position, as shown in FIG. 2A. The makeup process may be repeated until the tubular string has reached the desired length.

Figure 4:
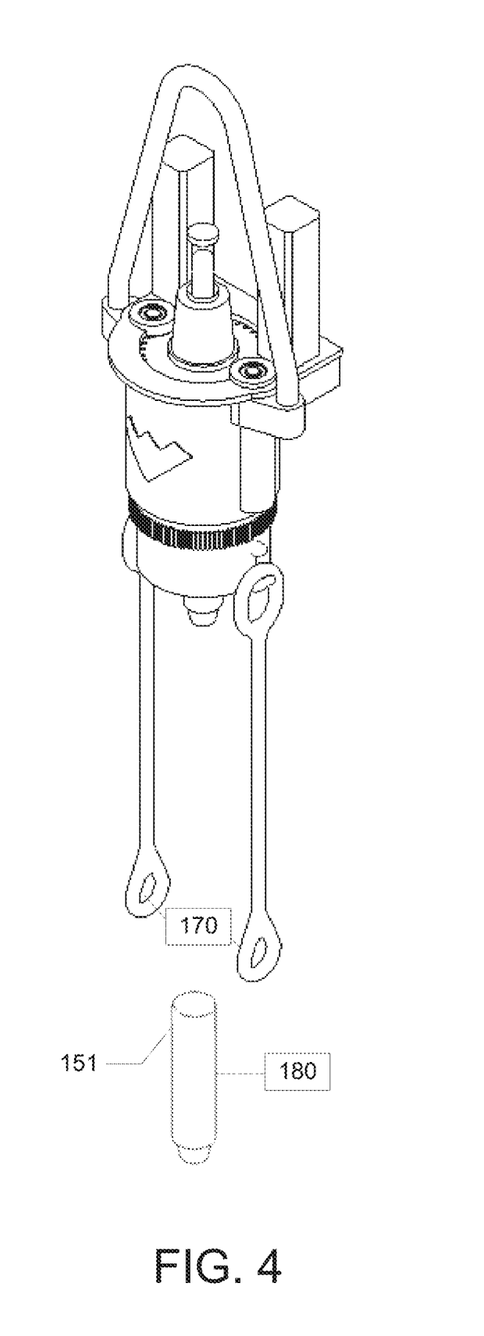
FIG. 4 illustrates a perspective view of the top drive unit connected to an elevator for gripping and lifting a tubular.

In another embodiment, referring to FIG. 4, an elevator 170 is shown connected to the top drive unit 100 during makeup of a tubular 151 with a tubular string. In particular, the elevator 170 is connected to the bail housing 130 via the hooks 133 of the elevator links 131. In operation, the top drive unit 100 is lowered to place the elevator 170 into engagement with the tubular 151. The tubular 151 is retained by the elevator 170 using, for example, a load-bearing ring.

The weight of the tubular 151 is transferred to the compensation cylinders 126 through the elevator 170, the bail links 131, the bail housing 130, the thrust bearing 132, the nut 134, and the carrier 125. The compensation cylinders 126 reduce the amount of tubular weight that is set down on the threads of the tubular 151 and the tubular string during the makeup or breakout process.

The top drive unit 100 moves the elevator 170 and the tubular 151 into position for threaded connection with the tubular string. The drive stem 123, second gear 124, carrier 125, bail housing 130, and elevator links 131 are in the upper, retracted position shown in FIG. 2A to begin the makeup between the tubular 151 and the tubular string. The tubular 151 is rotated using a tong assembly 180 (FIG. 4) to makeup the connection to the tubular string. The tong assembly 180 may be a power tong. During makeup, the compensation cylinders 126 may compensate for the downward travel of the tubular 151 due to the interaction between the threads by lowering the carrier 125, the second gear 124, the drive stem 123, and the bail housing 130. FIG. 1 shows the carrier 125, the second gear 124, the drive stem 123, the bail housing 130, and the elevator links 131 in the lower, extended position.

After the threaded connection is complete, the top drive unit 100 may disengage the tubular 151 by releasing the tubular 151 from the elevator 170. The makeup process may be repeated until the tubular string has reached the desired length.

While the foregoing is directed to embodiments of the present disclosure, other and further embodiments of the disclosure may be devised without departing from the basic scope thereof, and the scope of the invention is determined by the claims that follow.

The invention claimed is:

1. A top drive unit, comprising:
   a top drive housing;
   a drive stem disposed in the top drive housing;
   a carrier configured to axially move the drive stem relative to the top drive housing; and
   a drive mechanism for rotating the drive stem.

2. The top drive unit of claim 1, wherein the drive mechanism comprises:
   a first gear; and
   a second gear coupled to the drive stem and rotatable by the first gear.

3. The top drive unit of claim 2, wherein the drive mechanism further comprises an actuator for rotating the first gear.

4. The top drive unit of claim 3, wherein the actuator is an electric motor.

5. The top drive unit of claim 2, wherein the second gear is axially movable relative to the top drive housing.

6. The top drive unit of claim 5, wherein the first gear is configured to rotate the second gear as the second gear moves axially.

7. The top drive unit of claim 1, wherein the carrier is axially movable relative to the top drive housing.

8. The top drive unit of claim 7, wherein the drive stem is disposed in the carrier.

9. The top drive unit of claim 8, wherein the drive stem is rotatable relative to the carrier.

10. The top drive unit of claim 9, wherein the drive stem is rotatable while moving axially relative to the top drive housing.

11. The top drive unit of claim 1, further comprising a bail housing, wherein the drive stem extends through a bore of the bail housing.

12. The top drive unit of claim 11, wherein the bail housing is axially movable relative to the top drive housing using the carrier.

13. The top drive unit of claim 1, wherein the carrier comprises a tubular housing.

14. A method of making up a tubular connection using a top drive unit, comprising:
   connecting a makeup tool to a drive stem of the top drive unit;
   engaging a tubular using the makeup tool;
   supporting the tubular using a carrier, the carrier movably coupled to a top drive housing;
   rotating the tubular using the drive stem to connect the tubular to a tubular string; and
   axially moving the drive stem relative to the top drive housing during connection of the tubular to the tubular string.

15. The method of claim 14, wherein moving the drive stem comprises lowering the carrier.

16. The method of claim 14, wherein rotating the tubular comprises rotating the drive stem using a drive mechanism.

17. The method of claim 14, wherein supporting the tubular comprises supporting a weight of the tubular.

18. A method of making up a tubular connection using a top drive unit, comprising:
   retaining a tubular in an elevator connected to a bail housing of the top drive unit, the top drive unit having a top drive housing and a carrier coupled to the bail housing;
   supporting the tubular using the carrier;

rotating the tubular using a tong assembly to connect the tubular to a tubular string; and axially moving the bail housing and the carrier relative to the top drive housing during connection of the tubular to the tubular string.

19. The method of claim 18, wherein supporting the tubular comprises supporting a weight of the tubular.

20. The method of claim 18, wherein the tubular is rotated relative to the top drive housing.

* * * * *